Sept. 15, 1970     R. P. HAWKINSON, JR     3,528,476
TIRE BUFFING APPARATUS
Filed March 8, 1968     5 Sheets-Sheet 4
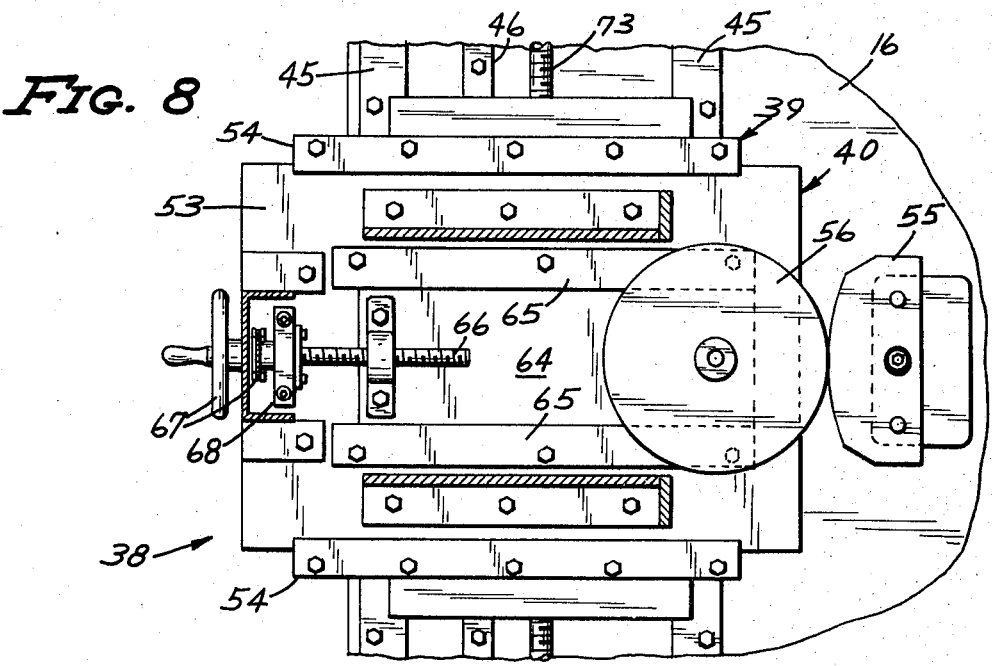
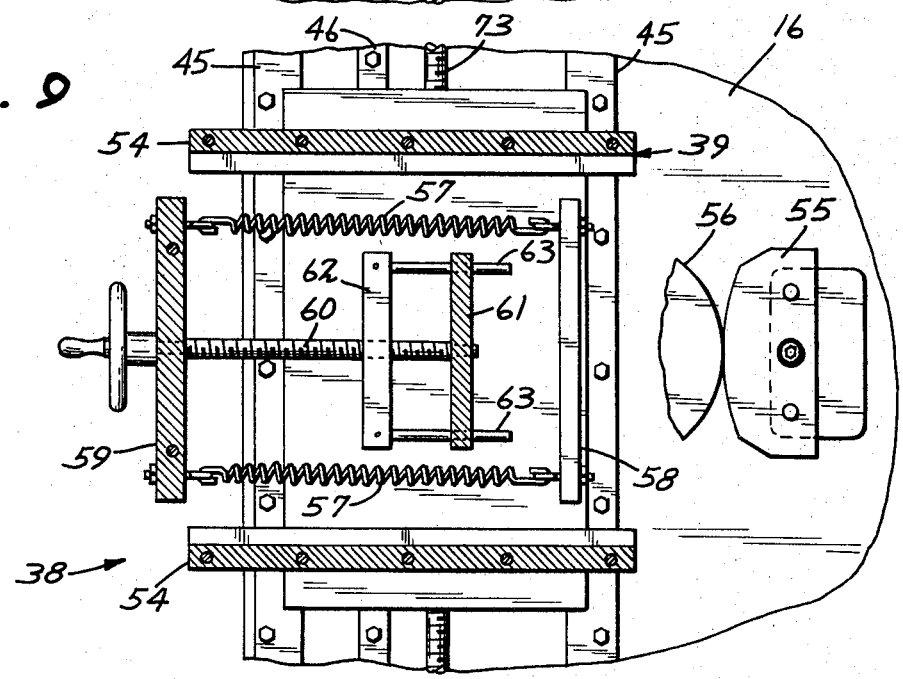
INVENTOR.
RAYMOND P. HAWKINSON, JR.
BY
Merchant & Gould
ATTORNEYS Sept. 15, 1970  R. P. HAWKINSON, JR  3,528,476
TIRE BUFFING APPARATUS
Filed March 8, 1968  5 Sheets-Sheet 5
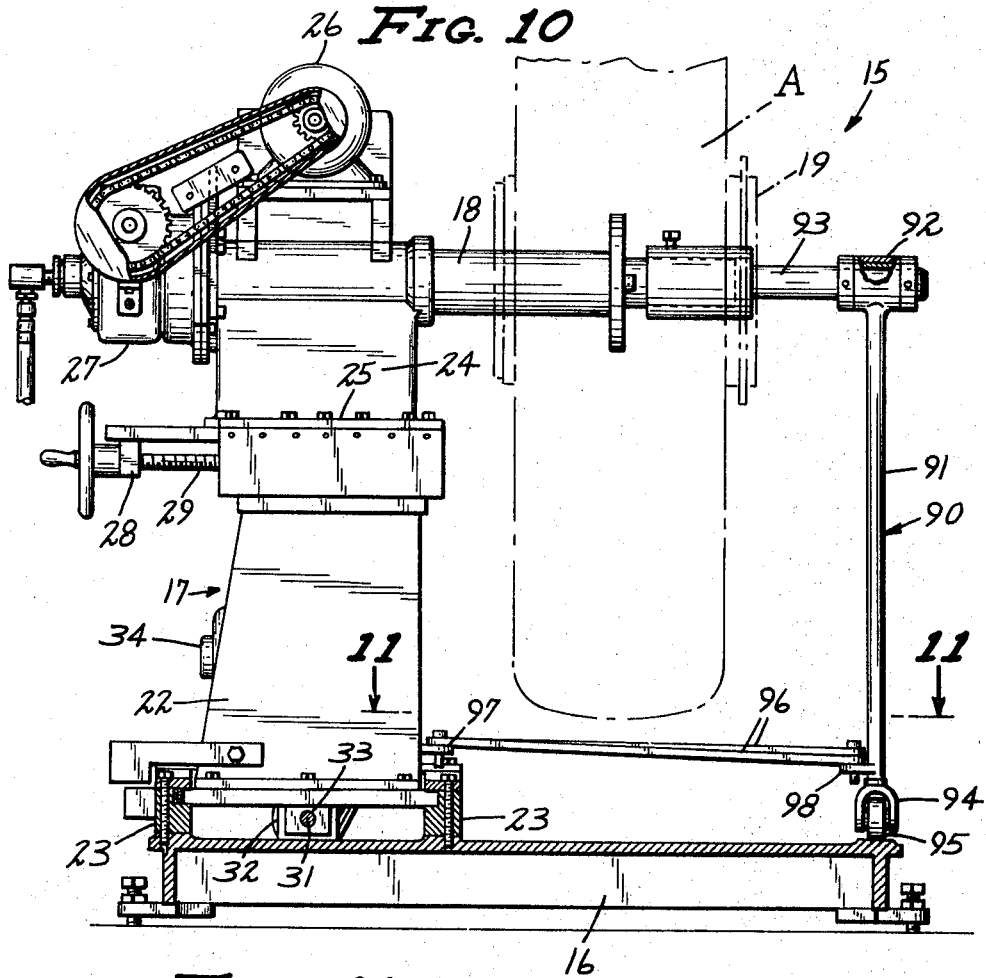
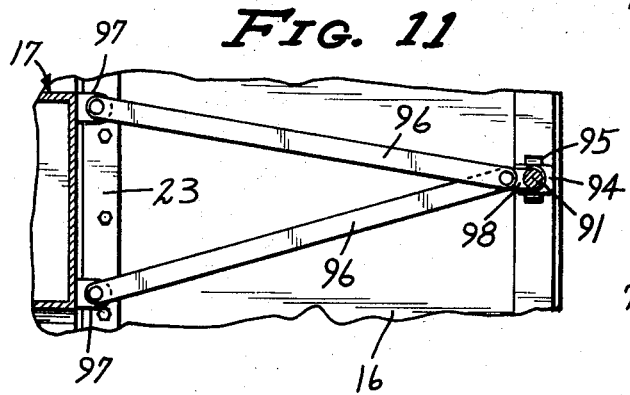
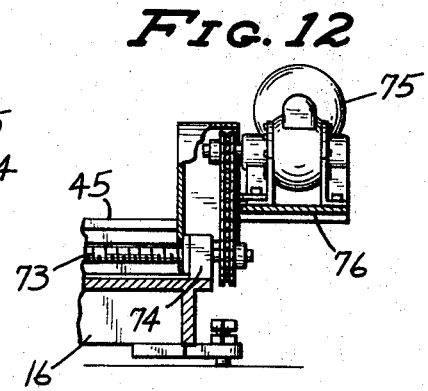
INVENTOR.
*RAYMOND P. HAWKINSON, JR.*
BY
*Merchant & Gould*
ATTORNEYS United States Patent Office 3,528,476
Patented Sept. 15, 1970

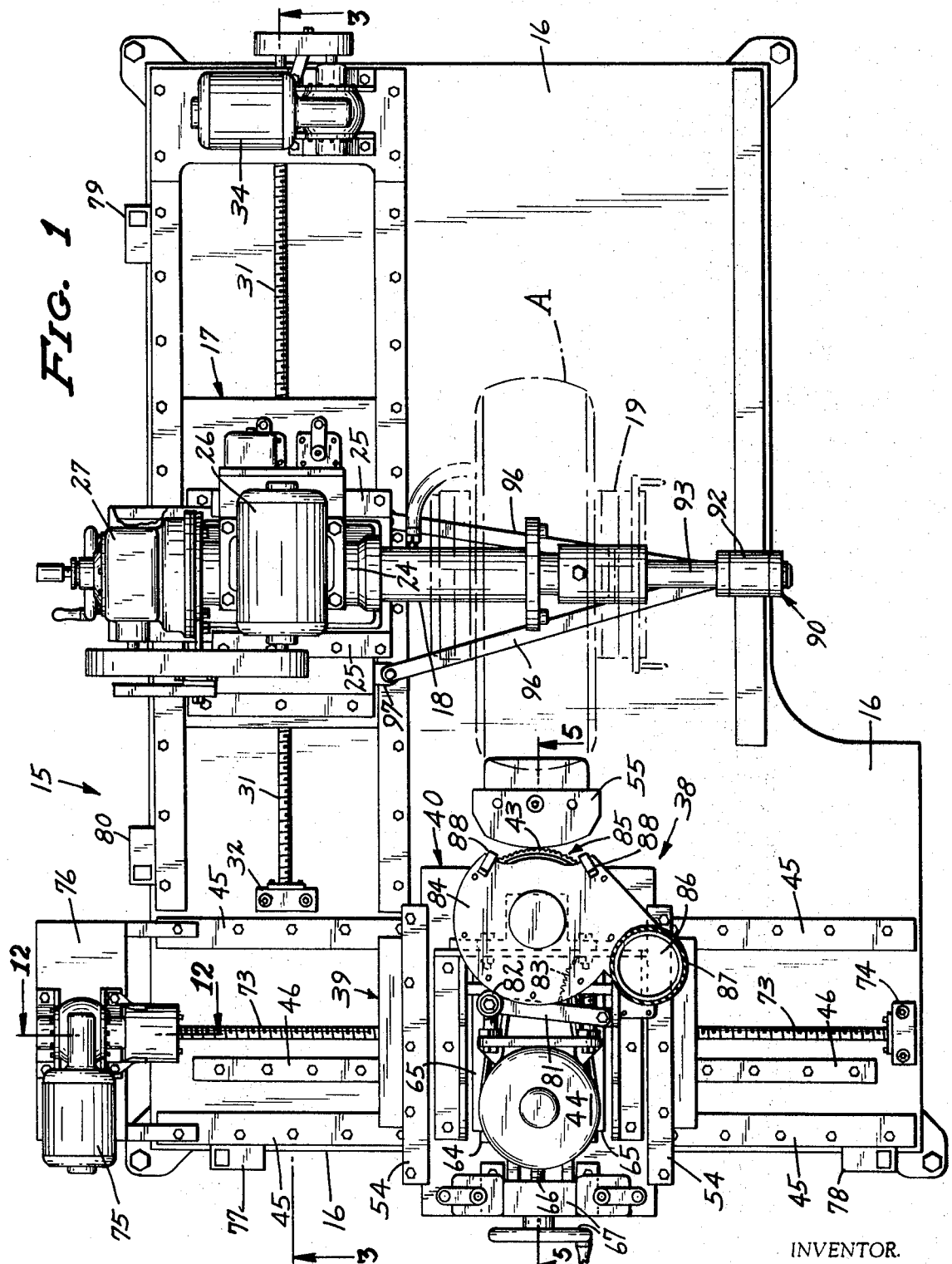

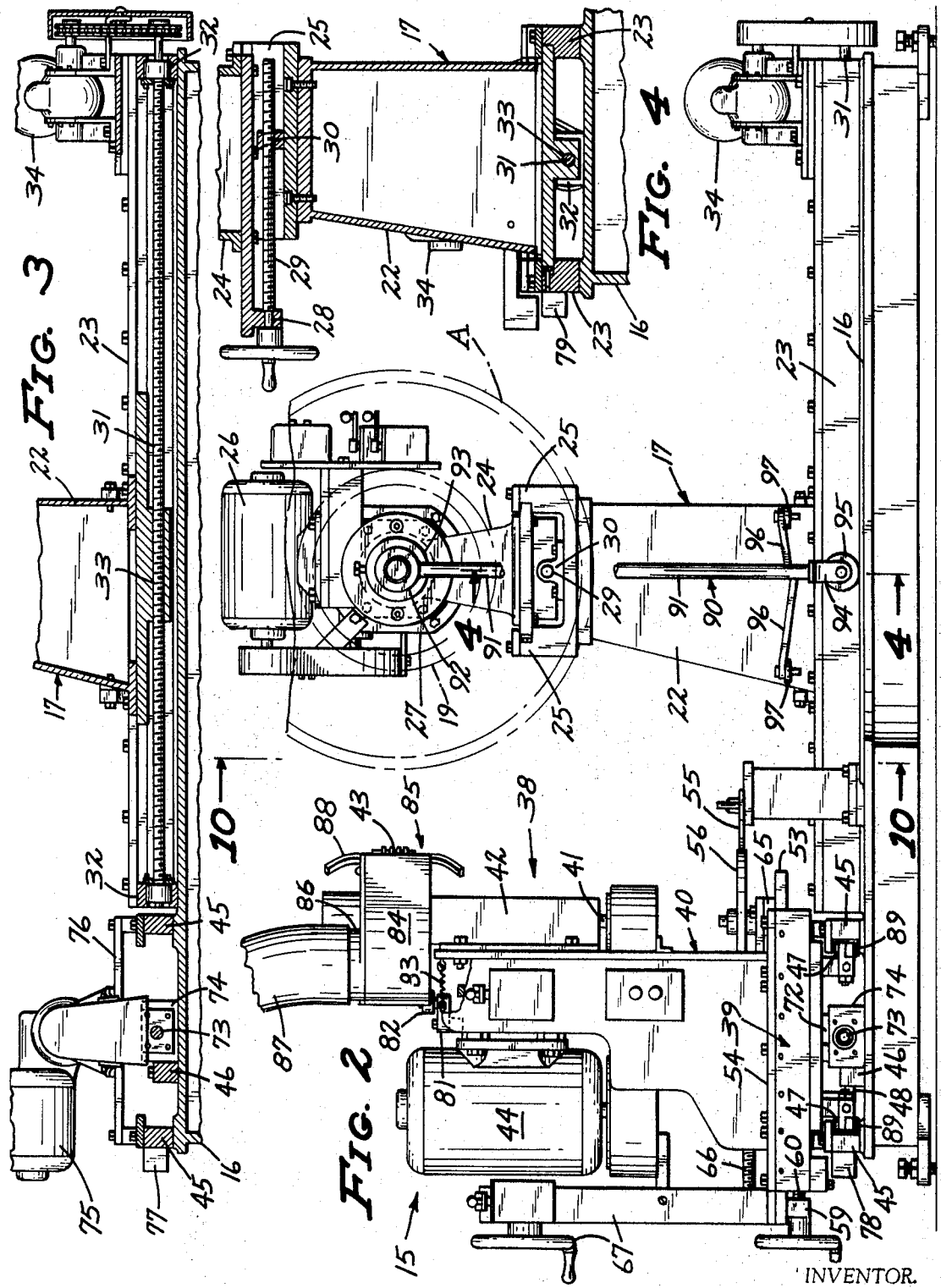

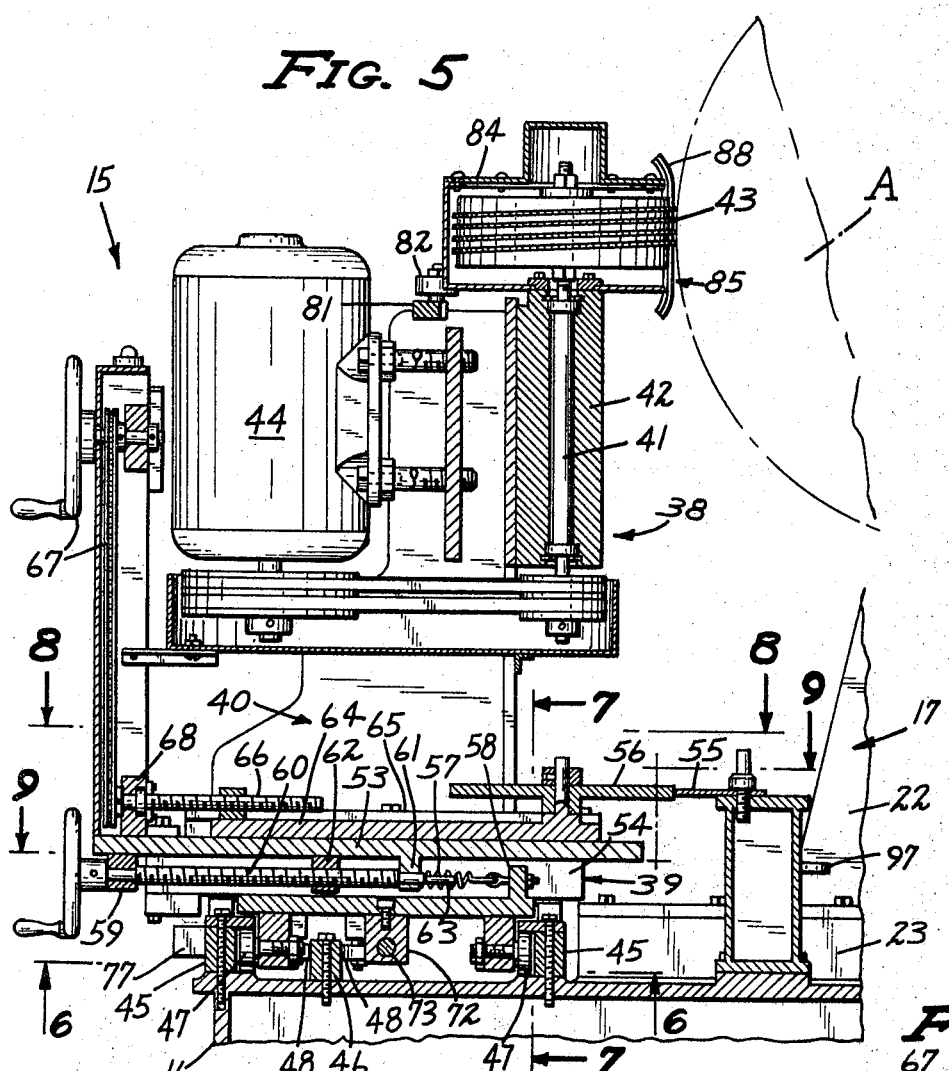

3,528,476
TIRE BUFFING APPARATUS
Raymond P. Hawkinson, Jr., Minneapolis, Minn., assignor to Paul E. Hawkinson Company, Minneapolis, Minn., a corporation of Minnesota
Filed Mar. 8, 1968, Ser. No. 711,638
Int. Cl. B29h 21/08
U.S. Cl. 157—13                                11 Claims

ABSTRACT OF THE DISCLOSURE

An automatic tire truing and buffing machine having a base, and first and second carriages mounted on the base, the first carriage being adapted to mount a tire for rotation and the second carriage being adapted to rotatably mount a buffing wheel for movements in directions parallel with and normal to the axis of rotation of the tire, a cam having a cam surface which corresponds to the cross-sectional contour of the crown of the tire and a cam follower are mounted on the base and second carriage respectively whereby movement of the second carriage in directions parallel with the axis of rotation of the tire translates to movements of the buffing wheel in directions normal to the axis of rotation of the tire. The first carriage is adjustable in directions parallel with and normal to the axis of rotation of the tire, and the second carriage is provided with means for automatically imparting reciprocatory movements of the second carriage in directions parallel with the axis of the tire and for imparting adjustments to the buffing wheel in directions normal to the axis of rotation of the tire.

BACKGROUND OF THE INVENTION

Devices of the above character are utilized to true the unevenly worn crowns of tires prior to application of a strip of rubber, known as a camelback, in the process of recapping tires. It will be appreciated, by those skilled in the art, that a tire not properly prepared results in a poorly recapped tire which during use may be subject to separation of the camelback from the crown of the tire. That is, firstly, the uneven material on the crown of the worn tire casing must be removed at a slow enough rate relative to depth so as not to damage the tire casing, due to excessive friction; and, secondly, such material must be removed transversely of the crown of a tire casing relative to the diameter of the tire and the rotary speed thereof in order to provide a smooth crown surface on which the camelback may be adhered. The latter is particularly true in the case of the larger tire casings, such as those commonly used on earthmovers, aircraft, etc. Also, it is desirable to provide a means for automatically imparting the buffing wheel movements relative to the tire and controlling the contour being buffed on the many various shapes of tire crowns, without relying on manual skills of an operator.

Prior art devices of the class described normally attempt to accomplish the above ends by providing devices which include structure permitting constant reciprocatory movement between both the means mounting the buffing wheel and the means mounting the tire casing responsive to engagement of a cam and cam follower. An example of such structure being disclosed in U.S. Letters Patent 3,162,233, issued Dec. 22, 1964, and entitled "Tire Buffing Machine."

In the above-described structure, it is apparent that extremely critical tolerances must be had between the various moving parts to obtain and maintain tire truing and buffing operations at an acceptable standard of accuracy. With this type of structure, without providing extremely heavy and, consequently, very expensive construction, such standards would be extremely hard to maintain. Such is particularly the case during constant use with larger and heavier tires, wherein the carriage mounting the tire and the carriage mounting the buffing wheel must both reciprocate during each pass of the buffing wheel transversely of the crown of the tire.

SUMMARY OF THE INVENTION

With the above in mind, there is provided an automatic tire truing and buffing machine comprising a base. A first carriage means, including a power-operated first rotary shaft extending laterally therefrom which is adapted to mount a tire casing for rotary movements thereon, is mounted in the base. Means associated with the first carriage and the base is provided to impart compound adjustments to the tire normal to and axially of the first rotary shaft. A second carriage means includes a power operated second rotary shaft adapted to mount a buffing wheel for rotation on an axis normal to the first rotary shaft. Means associated with the second carriage means is provided to impart adjustment and permit reciprocatory movements of the buffing wheel relative to the tire in directions normal to the axis of the first rotary shaft and permit and impart automatic reciprocatory movements of the second carriage means in directions parallel to the axis of the first rotary shaft. A cam and cam follower, including means biasing same toward engagement, is provided. One of the cam and cam followers is carried by the base and the other thereof is carried by the means for permitting reciprocatory movements of said buffing wheel whereby reciprocatory movement of said second carriage in directions parallel to the axis of the first rotary shaft translates to reciprocatory movement of the buffing wheel in directions normal to the axis of the first rotary shaft responsive to engagement of the cam and cam follower.

The above structure provides a machine for automatically truing and buffing tire casings to be retreaded wherein only the second carriage means is subjected to reciprocatory action during the buffing operation. Thus, extremely large and heavy tire casings may be mounted on the rotary shaft of the first carriage means and, after initial adjustments, maintained in a stationary rotating position to be buffed. This arrangement permits relative inexpensive mounting structure for the first carriage since there is only a minimum amount of movement with respect thereto. In addition, a rigid structure is provided whereby an operator may maintain extremely accurate standards of adjustments and buffing operations over extended periods of heavy use.

It is, therefore, a principal object of the invention to provide a device capable of maintaining a high degree of accuracy during the truing and buffing of tires over an extended period of use.

It is another object of the invention to provide a device particularly adaptable to true and buff the larger types of tires with great accuracy.

It is a further object of the invention to provide a device for truing and buffing tires which requires but a minimum of training and skill to operate.

It is a still further object of the invention to provide a device of the character described which is extremely strong and durable in use and which is relatively inexpensive to produce.

The above and still further important advantages of this invention will become apparent to those skilled in the art upon further consideration of the following specification, appended claims and attached drawings.

BRIEF DESCRIPTION OF THE DRAWINGS

FIG. 1 is a view in top plan of the automatic tire truing and buffing machine constructed in accordance with my invention;

FIG. 2 is a view in side elevation thereof as seen from right to left of FIG. 1;

FIG. 3 is a sectional view as seen generally from the line 3—3 of FIG. 1; portions thereof broken away;

FIG. 4 is a sectional view as seen from the line 4—4 of FIG. 2, portions thereof broken away;

FIG. 5 is an enlarged sectional view as seen from the line 5—5 of FIG. 1;

FIG. 6 is a horizontal sectional view as seen from the line 6—6 of FIG. 5, portions thereof broken away;

FIG. 7 is a sectional view as seen from the line 7—7 of FIG. 5, portions thereof broken away;

FIG. 8 is a horizontal sectional view as seen from the line 8—8 of FIG. 5;

FIG. 9 is a horizontal sectional view as seen from the line 9—9 of FIG. 5;

FIG. 10 is a view in vertical section as seen from the line 10—10 of FIG. 2, portions thereof broken away and shown in section;

FIG. 11 is a fragmentary view in horizontal section as seen from the line 11—11 of FIG. 10; and FIG. 12 is a fragmentary sectional view as seen from the line 12—12 of FIG. 1.

DESCRIPTION OF THE PREFERRED EMBODIMENT

Referring to the drawings, wherein like characters indicate like parts throughout the several views, there is shown an automatic tire truing and buffing machine constructed in accordance with the present invention and indicated generally by the numeral 15. Buffing machine 15 is comprised of a generally horizontally disposed base 16 having mounted thereon a first carriage means 17 which includes a laterally extended power-operated first rotary shaft 18. Shaft 18 is adapted to mount a tire casing A, for common rotation therewith, by means of a tire holding apparatus or rim, such as that disclosed in prior U.S. Letters Patent No. 3,331,412, issued July 18, 1967 and entitled "Tire Holding Apparatus," and indicated generally by the numeral 19. Apparatus or rim 19 forms no part of the instant invention, and, therefore, will not be described in detail since any conventional rim may be utilized to mount the tire A.

First carriage 17 includes a base portion 22 mounted and guided on base 16 for adjustments in directions normal to the axis of the first shaft 18, by means of laterally spaced guide rails 23, and a head portion 24, which is adapted to rotatably mount the first shaft 18. Head portion 24 is mounted on base portion 22 for adjustments in directions parallel to the axis of first shaft 18 by means of laterally spaced guide rails 25 carried by the base portion 22 and is adapted to mount power means in the nature of an electric motor 26 and a gear reduction transmission 27. Electric motor 26 and gear reduction transmission 27 are operatively connected to impart rotation to the first shaft 18 and tire A mounted thereon. Rotatably mounted on the head portion 24, as at 28, is a handle-equipped, screw-threaded shaft 29. Shaft 29 has screw threaded engagement with base portion 22, as at 30, and upon rotation thereof, imparts adjustments to the head portion 24 in directions parallel to the axis of the first shaft 18. A screw-threaded shaft 31 is disposed parallel to and between the guide rails 23 and is mounted for rotation by means of bearing blocks 32 disposed adjacent opposite ends thereof. Threaded shaft 31 has threaded engagement with base 22, as at 33, and is adapted to be rotated by means of a reversible, gearhead equipped, electric motor 34, operatively connected to one end of the threaded shaft 31. Energization of motor 34 serves to impart adjustments to said carriage 17, shaft 18, and tire A in directions normal to the axis of shaft 18.

A second carriage means, indicated generally by the numeral 38, includes a base portion 39 and a head portion 40 rotatably mounting a secondary rotary shaft 41, as at 42, for rotation on an axis normal to the axis of first rotary shaft 18. A buffing wheel 43 is detachably affixed to one end of second rotary shaft 41 for common rotation therewith. Operatively connected to the other end of second rotary shaft 41 is an electric motor 44 which imparts rotation to the second rotary shaft 41. As shown particularly in FIGS. 5-9, base portion 39 is mounted for movements, of the carriage 38 and buffing wheel 43, in directions parallel to the axis of first rotary shaft 18 by means of laterally spaced guide rails 45 and a guide rail 46, disposed between the guide rails 45. All of the rails 45, 46 are mounted on base 16 to extend in a direction parallel to the axis of first rotary shaft 18. A plurality of roller elements 47 are rotatably mounted on the base 39 in a manner to engage rails 45 and positively prevent vertical movement of carriage 38 and a plurality of roller elements 48 are rotatably mounted on the base 39 in a manner to positively prevent transverse movement of the base portion 39 relative to guide rails 45, 46. It will be seen, by particular reference to FIGS. 5-7, that the particular manner of mounting the roller elements 47, 48 relative to the guide rails 45, 46 positively precludes unwanted chatter and/or movement of second carriage 38 as it moves along the rails 45, 46 and provides a very stable platform for the support of buffing wheel 43 during buffing operations on a tire A. In addition, by mounting the carriage for movements on roller elements 47, 48 the large and heavy mass of carriage 38 is maintained in a desired path of travel over prolonged periods of reciprocatory movements of the carriage 38.

Head portion 40 is mounted, by means of a slide element 53 carried by the head portion 40 and guide rails 54 carried by the base portion 39, to permit reciprocatory movements of the head portion 40 and buffing wheel 43 in directions normal to the axis of first shaft 18. For the purpose of imparting such movements to head portion 40, there is provided a cam and cam follower 55, 56 respectively. Cam 55 is mounted on base 16 so as to be engaged by cam follower 56, which in this case takes the form of a roller element rotatably mounted on slide element 53. With reference to FIGS. 1, 8 and 9, it will be seen that the particular desired shape of the crown portion of the tire A being buffed is reproduced on the edge of the cam adjacent the roller 56 and as the roller 56 progresses therealong, during movement of the carriage 38 in a direction parallel to the axis of first shaft 18, such movement is translated to movement of the head portion 40 and buffing wheel 43 in directions normal to the axis of first shaft 18 thus reproducing exactly on the crown portion of the tire A the shape of the edge of cam 55 followed by cam follower 56. A pair of coiled tension springs 57 are each connected at opposite ends between a stop element 58, carried by base 39, and a bearing element 59, carried by slide element 53, so as to bias cam follower 56, carried by slide element 53, toward engagement with cam 55 during the above movements. For the purpose of limiting the biasing movements imparted by springs 57 to slide elements 53 when cam follower 56 becomes disengaged from cam 55 during movements of carriage 38 parallel to the axis of first shaft 18, there is provided a threaded, handle-equipped shaft 60. Shaft 60 is journalled for rotation in the bearing block 59 carried by slide element 53, and a second bearing block 61 also carried by slide element 53. A nut 62, elongated transversely of the threaded shaft 60 has screw-threaded engagement with shaft 60 and is provided at opposite ends with arms 63 which project through openings in bearing block 61 toward stop element 58. Rotation of shaft 60 adjusts nut 62 and arms 63 relative to stop element 58 to limit movement of slide element 53 under the bias of springs 57.

For the purpose of providing adjustments of the buffing wheel in directions normal to the axis of first shaft 18, in order to determine the amount of material to be removed from the tire casing A, cam follower 56 is mounted on a second slide element 64. Second slide element 64 is mounted on slide element 53, by means of spaced guide elements 65, for movements in directions normal to the axis of first shaft 18 or toward and away from cam 55. A threaded shaft 66, including means 67 for rotating same, is mounted for rotation in a bearing block 68, carried by slide element 53, and has threaded engagement with second slide element 64. With this arrangement, when cam follower 56 is in engagement with cam 55, rotation of threaded shaft 66 forces slide 53, head portion 40, and buffing wheel 43 in a direction normal to the axis of first shaft 18 or toward and away from the first shaft 18 depending upon the direction of rotation of shaft 66. Thus, a means for imparting fine adjustments of the buffing wheel 43 relative to a tire A to determine the amount of material to be buffed is provided.

In order that reciprocatory movements in directions parallel to the axis of first shaft 18 may be imparted to carriage means 38 to cause buffing wheel 43 to traverse the crown portion of tire A at a controlled rate of speeed, base 39 has threaded engagement as at 72 with a screw-threaded shaft 73. Shaft 73 is disposed between the guide rails 45 and is mounted for rotation by means of bearing blocks 74 carried by base 16 at positions adjacent opposite ends of guide rails 45. A reversible, variable speed, gear head equipped, electric motor 75 is mounted on a bracket 76 carried by the guide rails 45 adjacent the end thereof which is disposed in close proximity to the guide rails 23 mounting carriage 17. Motor 75 is operatively connected to impart rotation to threaded shaft 73 to cause carriage 38 to move along guide rails 45, 46 at a controlled rate of speed. A pair of magnetically operated sensing devices 77, 78 are mounted adjacent opposite ends of one of the guide rails 45. Sensing devices 77, 78 are operatively connected to the electrical circuit (not shown) for energizing the motor 75 and are adapted to reverse the direction of rotation of motor 75 and movement of carriage 38 as the carriage 38 approaches either of the sensing devices 77, 78. A second pair of sensing devices 79, 80 are mounted on one of the guide rails 23, in a like manner to devices 77, 78, to limit adjustments of first carriage 17 along guide rails 23 by reversing motor 34.

Rotatably mounted on the second carriage 38, on an axis coaxial with respect to shaft 41, is a generally circular shroud 84. Shroud 84 partially encloses buffing wheel 43 and defines in the periphery thereof a mouth 85 and an outlet 86 adapted to be attached to a source of suction (not shown) by means of a flexible tube 87. Disposed along opposite sides of the mouth 85 are a pair of circumferentially spaced lip elements 88. Lip elements 88 extend generally axially of the axis of rotation of shaft 41 and are adapted to engage an adjacent portion of tire A as the buffing wheel 43 moves transversely of the crown of tire A. In this manner as the buffing wheel 43 moves into position to buff the crown shoulder of tire A, a lip element 88 engages the crown of the tire A and the shroud 84 rotates to a position wherein the mouth 85 is is in a position to catch a maximum amount of material removed by the buffing wheel 43. Thus, moving parts of the carriage means 38 are kept substantially free of foreign material which would otherwise hinder operation of the carriage means 38. A horizontally extended arm 81 is pivotally secured at one end to the carriage 38 for pivotal swinging movements of the other end thereat toward and away from shaft 41 of buffing wheel 43. A roller element 82 is mounted on the other end of arm 81 in a manner to engage and rotate against the peripheral side of shroud 84. A coiled tension spring 83 is connected between the arm 81 and an adjacent portion of carriage 38 so as to bias the arm in a direction to cause such engagement of roller element 83 and shroud 84. In this manner unwanted rotational movement of shroud 84 is somewhat retarded during adjustment of buffing wheel 43. Any small amounts of foreign material, not retained by the shroud 84, which may be deposited on the guide rails 45 in which the rollers 47 travel, is removed by brushes 89. One each of the brushes 89 is mounted in advance of the path of travel of rollers 47, see FIG. 6, so as to clean the guide rails 45 regardless of which direction the base 39 of carriage 38 is traveling during its reciprocating movements.

When it is necessary to buff an extremely large and heavy tire, an auxiliary mobile support means 90 may be utilized to support the free end of first shaft 18. Support means 90 includes a vertically disposed leg 91 having one end thereof formed to provide a journal, as at 92, for an axial extension 93 rigidly secured to the free end of the shaft 18, as shown in FIG. 10. Journalled for rotation at the other end of leg 91, in a fork 94, is a roller 95. Roller 95 provides mobility for mobile support 90 during initial adjustments of the carriage 17 normal to the axis of the shaft 18. To maintain the leg 91 in a vertical position during such adjustments, there is provided a pair of braces 96. Braces 96 are connected at one end to laterally spaced lugs 97 carried by first carriage 17 and at their other ends to a single lug 98 carried by the leg 91. In this manner, any movement of the carriage 17 and shaft 18 thereon in directions normal to the axis of shaft 18, results in common movement of mobile support 90. Thus, carriage 17 and associated parts thereof are protected from damage by undue strain imparted by such large tires. It will be noted that adjustments of head 24 of carriage 17 in directions axial of shaft 18 may be compensated for by journalling the leg 91 at different positions relative to extension 93 to maintain the vertical position of leg 91.

OPERATION

A tire A to be buffed is first mounted on the adjustable rim 19 and inflated to a desired pressure as described in the above-mentioned U.S. Letters Patent 3,331,412. A cam element 55, having a cam surface corresponding to the desired cross sectional shape of the crown of tire A is mounted on base 16 to be engaged by cam follower 56 and second carriage 38 is moved to a position, by energizing motor 75 to rotate shaft 73, wherein the buffing wheel 43 is generally centrally located with respect to the crown of tire A. Mobile support 90 may be mounted on shaft 18 and carriage 17 to provide additional support if the tire A being buffed is of the larger type such as illustrated by broken lines in FIG. 10. Tire A is then adjusted by rotating shaft 29 to a position wherein it is bisected by an extended plane which bisects the axis of rotation of buffing wheel 43 and cam follower 56 (see FIG. 1). Thereafter, motor 34 is energized to rotate shaft 31 and adjust or move tire A to a position wherein the crown thereof is in close proximity to buffing wheel 43.

Rotation of shaft 66, by means 67, in a direction to move second slide 64 from right to left with respect to FIGS. 5, 8, causes head portion 40 and buffing wheel 43 to be moved toward the crown of tire A a distance sufficient to remove a desired amount of material from the tire A. Carriage 38 is then moved along guide rails 45, 46 until cam follower 56 becomes disengaged from cam 55 and shaft 60 is rotated to adjust the stop arms 63 relative to stop element 58 to limit movement of slide 53 in a direction from left to right with respect to FIG. 5. This prevents subsequent movement of carriage 38 along rails 45, 46 from causing engagement of cam follower 56 with cam 55 at points other than the cam surface thereof.

Motor 26 may now be energized to rotate tire A at a desired speed of rotation and motor 44 energized to impart rotation to buffing wheel 43. It is noted that motor 26 is a variable speed motor and is set to impart a preselected speed of rotation to tire A relative to the diametric dimension of the tire A. That is, the larger the diametric dimension of the tire A the faster the speed or rotation thereof so as to present a greater amount of circumferential surface to the buffing wheel 43. Motor 75 is now energized to impart rotation to shaft 73 and move carriage 38 along guide rails 45, 46 at a pre-selected rate of speed to cause buffing wheel 43 to traverse the crown of tire A at a rate of speed relative to the rotation of tire A. That is, the motor 75 must be set to move the carriage 38 and buffing wheel 43 at a slow rate of speed transversely of the crown of tire A in order that all of the desired material is removed therefrom and so a helical groove is not formed in the crown portion of tire A by buffing wheel 43. During movement of the carriage 38 transversely of the crown of tire A cam follower 56 engages the cam surface of cam 55 whereby the movement of carriage 38 along guide rails 45, 46 translates to movement of the buffing wheel 43 toward and away from the crown of tire A or in directions normal to the axis of shaft 18. Thus, buffing wheel 43 follows a path of travel corresponding to the desired cross sectional contour of the crown of tire A and the contour of the cam surface of cam 55. As the cam follower becomes disengaged from cam 55 stop arms 63 engage stop element 58 limiting further movement of slide element 53 under the bias of springs 57.

Further movement of the carriage 38 after disengagement of cam 55 and cam follower 56 moves same into position to actuate sensing switch 77, switch 77 is connected to reverse the direction of rotation of motor 75 and, consequently, the direction of travel of carriage 38. Upon movement in the opposite direction, carriage 38 and parts carried thereby again repeat the above buffing movements upon engagement of cam 55 and cam follower 56 and as the carriage 38 approaches sensing device 78, actuates same, to again reverse motor 75. After one or more passes of the carriage 38 transversely of the crown of the tire A, or after all the material, determined by the initial adjust, has been removed, the buffing wheel 43 may again be adjusted to remove additional material from tire A by rotating shaft 66 in a direction to move second slide 64 from right to left in FIGS. 5, 8. Such adjustments are made until the buffing wheel 43 engages and buffs the crown of tire A completely throughout the circumference thereof.

Thus, any excessive material caused by uneven wear of tire A is removed and the crown surface thereof is correctly prepared for subsequent mounting of a strip of camelback thereon. Controlling the speed of rotation of tire A, and the speed of transverse movement of buffing wheel 43 relative to the tire A, together with adjustment of the buffing wheel 43 toward the tire A in relatively small increments of adjustment, avoids excessive friction or heat at the point of contact of the buffing wheel 43 with tire A. Additionally, unevenly buffed contours and high and low shoulders are also avoided, resulting in a smooth texture of the crown of tire A and correct adherence of the strip of camelback thereon. This provides a recapped tire which is not subject to separation of the tread material during subsequent use thereof. It is also noted that the tire A is mounted in a stationary rotating position and only the carriage 38 and parts carried thereby are reciprocated during the buffing action. Thus, during the buffing of heavy earthmoving tires and the like, no attempt to impart reciprocatory movement to such tire, with the resultant strain and wear on parts of the machine 15 associated with carriage 17, is necessary. This results in a machine 15 adaptable to repeated heavy use with such tires without fear of loss of accuracy in the buffing operations thereof.

This invention has been thoroughly tested and found to be satisfactory and while I have shown and described a commercial embodiment of my tire buffing apparatus, it will be understood that the same is capable of modification without departure from the spirit and scope of the invention, as defined in the claims.

What is claimed is:

1. A tire truing and buffing machine for tires comprising:
    (a) a base;
    (b) first carriage means including a power-operated first rotary shaft extending laterally therefrom and adapted to mount a tire for rotary movements thereon;
    (c) second carriage means including a power-operated second rotary shaft adapted to mount a buffing wheel for rotary movements on an axis normal to said first rotary shaft;
    (d) means associated with said second carriage imparting adjustments and permitting reciprocatory movements of said buffing wheel relative to said tire in directions normal to the axis of said first rotary shaft and for imparting reciprocatory movements of said second carriage in directions parallel to the axis of said first rotary shaft;
    (e) a cam and cam follower;
    (f) means biasing said cam and cam follower toward engagement;
    (g) one of said cam and cam followers being carried by said base and the other thereof carried by said means for permitting reciprocatory movements to said buffing wheel whereby movement of said second carriage in directions parallel to the axis of said first rotary shaft translates to movement of said buffing wheel is directions normal to the axis of said first rotary shaft responsive to engagement of said cam and cam follower,
    (h) said second carriage means including a slide element mounting said buffing wheel for movements normal to the axis of said first rotary shaft and in which one of said cam and cam followers is mounted on said slide element,
    (i) and means associated with said slide element for limiting movement of said buffing wheel toward said first rotary shaft when said cam and cam follower are out of engagement during movements of said second carriage in directions parallel to said first rotary shaft.

2. The structure of claim 1 in which said means includes:
    (a) a stop element fixedly mounted on said second carriage means;
    (b) laterally spaced bearing blocks carried by said slide element;
    (c) a threaded shaft journaled for rotation in said bearing blocks;
    (d) means for imparting rotary movements to said threaded shaft;
    (e) a nut threadedly engaged on said threaded shaft; and
    (f) an arm carried by said nut and engageable with said stop element when said cam is disengaged from said cam follower.

3. A tire truing and buffing machine for tires comprising:
    (a) a base;
    (b) first carriage means including a power-operated first rotary shaft extending laterally therefrom and adapted to mount a tire for rotary movements thereon;
    (c) second carriage means including a power-operated second rotary shaft adapted to mount a buffing wheel for rotary movements on an axis normal to said first rotary shaft;
    (d) means associated with said second carriage imparting adjustments and permitting reciprocatory movements of said buffing wheel relative to said tire in directions normal to the axis of said first rotary shaft and for imparting reciprocatory movements of said second carriage in directions parallel to the axis of said first rotary shaft;
    (e) a cam and cam follower;
    (f) means biasing said cam and cam follower toward engagement;
    (g) one of said cam and cam followers being carried by said base and the other thereof carried by said means for permitting reciprocatory movements to said buffing wheel whereby movement of said second carriage in directions parallel to the axis of said first rotary shaft translates to movement of said buffing wheel in directions normal to the axis of said first rotary shaft responsive to engagement of said cam and cam follower, (h) and means associated with said first carriage means for imparting adjustments to said tire in directions normal to said first rotary shaft.

4. The structure of claim 3 in which the means for imparting adjustments to said first carriage normal to the axis of the rotary shaft thereof includes:
 (a) a threaded shaft journaled for rotation on said base on an axis normal to said first rotary shaft;
 (b) said threaded shaft having threaded engagement with said first carriage means;
 (c) a reversible motor operatively connected to said threaded shaft to impart rotation thereto; and
 (d) sensing means carried by said base and operatively connected to limit movement of said first carriage along said threaded shaft associated therewith.

5. A tire truing and buffing machine for tires comprising:
 (a) a base;
 (b) first carriage means including a power-operated first rotary shaft extending laterally therefrom and adapted to mount a tire for rotary movements thereon;
 (c) second carriage means including a power-operated second rotary shaft adapted to mount a buffing wheel for rotary movements on an axis normal to said first rotary shaft;
 (d) means associated with said second carriage imparting adjustments and permitting reciprocatory movements of said buffing wheel relative to said tire in directions normal to the axis of said first rotary shaft and for imparting reciprocatory movements of said second carriage in directions parallel to the axis of said first rotary shaft;
 (e) a cam and cam follower;
 (f) means biasing said cam and cam follower toward engagement;
 (g) one of said cam and cam followers being carried by said base and the other thereof carried by said means for permitting reciprocatory movements to said buffing wheel whereby movement of said second carriage in directions parallel to the axis of said first rotary shaft translates to movement of said buffing wheel in directions normal to the axis of said first rotary shaft responsive to engagement of said cam and cam follower;
 (h) and means associated with said first carriage means for imparting adjustments to said tire in directions axially of said first rotary shaft.

6. A tire truing and buffing machine for tires comprising:
 (a) a base;
 (b) first carriage means including a power-operated first rotary shaft extending laterally therefrom and adapted to mount a tire for rotary movements thereon;
 (c) second carriage means including a power-operated second rotary shaft adapted to mount a buffing wheel for rotary movements on an axis normal to said first rotary shaft;
 (d) means associated with said second carriage imparting adjustments and permitting reciprocatory movements of said buffing wheel relative to said tire in directions normal to the axis of said first rotary shaft and for imparting reciprocatory movements of said second carriage in directions parallel to the axis of said first rotary shaft;
 (e) a cam and cam follower;
 (f) means biasing said cam and cam follower toward engagement;
 (g) one of said cam and cam followers being carried by said base and the other thereof carried by said means for permitting reciprocatory movements to said buffing wheel whereby movement of said second carriage in directions parallel to the axis of said first rotary shaft translates to movement of said buffing wheel in directions normal to the axis of said first rotary shaft responsive to engagement of said cam and cam follower;
 (h) and said means associated with said second carriage for imparting adjustments to said buffing wheel relative to said tire in directions normal to the axis of said first rotary shaft including:
  (i) a second slide element mounted on said first slide element for movements in a direction normal to said first rotary shaft;
  (ii) a threaded shaft journaled for rotation on said first slide element and having threaded engagement with said second slide element whereby rotation of said thread shaft imparts said adjustments to said buffing wheel; and
  (iii) means carried by said first slide element for imparting rotation to said last-mentioned shaft.

7. A tire truing and buffing machine for tires comprising:
 (a) a base;
 (b) first carriage means including a power-operated first rotary shaft extending laterally therefrom and adapted to mount a tire for rotary movements thereon;
 (c) second carriage means including a power-operated second rotary shaft adapted to mount a buffing wheel for rotary movements on an axis normal to said first rotary shaft;
 (d) means associated with said second carriage imparting adjustments and permitting reciprocatory movements of said buffing wheel relative to said tire in directions normal to the axis of said first rotary shaft and for imparting reciprocatory movements of said second carriage in directions parallel to the axis of said first rotary shaft;
 (e) a cam and cam follower;
 (f) means biasing said cam and cam follower toward engagement;
 (g) one of said cam and cam followers being carried by said base and the other thereof carried by said means for permitting reciprocatory movements to said buffing wheel whereby movement of said second carriage in directions parallel to the axis of said first rotary shaft translates to movement of said buffing wheel in directions normal to the axis of said first rotary shaft responsive to engagement of said cam and cam follower;
 (h) and said means for imparting movements to said second carriage parallel to the axis of said power shaft of said first carriage means including
  (i) a threaded shaft journaled for rotation on said base on an axis parallel to the axis of said first rotary shaft;
  (ii) a reversible, variable speed motor operatively connected to said threaded shaft to impart rotation thereto; and
  (iii) sensing means carried by said base and operatively connected to reverse said motor responsive to movements of said second carriage.

8. A tire truing and buffing machine for tires comprising:
 (a) a base;
 (b) first carriage means including a power-operated first rotary shaft extending laterally therefrom and adapted to mount a tire for rotary movements thereon;
 (c) second carriage means including a power-operated second rotary shaft adapted to mount a buffing wheel for rotary movements on an axis normal to said first rotary shaft;
(d) means associated with said second carriage imparting adjustments and permitting reciprocatory movements of said buffing wheel relative to said tire in directions normal to the axis of said first rotary shaft and for imparting reciprocatory movements of said second carriage in directions parallel to the axis of said first rotary shaft;
(e) a cam and cam follower;
(f) means biasing said cam and cam follower toward engagement;
(g) one of said cam and cam followers being carried by said base and the other thereof carried by said means for permitting reciprocatory movements to said buffing wheel whereby movement of said second carriage in directions parallel to the axis of said first rotary shaft translates to movement of said buffing wheel in directions normal to the axis of said first rotary shaft responsive engagement of said cam and cam follower;
(h) and means connected to said first carriage means and extending between the extended end of the rotary shaft of said first carriage means and said base.

9. The structure of claim 8 in which said mobile support means includes:
(a) a leg;
(b) means rotatably connecting one end of said leg to said extended end of said first rotary shaft;
(c) roller means rotatably mounted on the other end of said leg and engageable with said base; and
(d) brace means connected at one end to said first carriage at laterally spaced points and at the other end thereof to said leg adjacent said roller means.

10. A tire truing and buffing machine for tires comprising:
(a) a base;
(b) first carriage means including a power-operated first rotary shaft extending laterally therefrom and adapted to mount a tire for rotary movements thereon;
(c) second carriage means including a power-operated second rotary shaft adapted to mount a buffing wheel for rotary movements on an axis normal to said first rotary shaft;
(d) means associated with said second carriage imparting adjustments and permitting reciprocatory movements of said buffing wheel relative to said tire in directions normal to the axis of said first rotary shaft and for imparting reciprocatory movements of said second carriage in directions parallel to the axis of said first rotary shaft;
(e) a cam and cam follower;
(f) means biasing said cam and cam follower toward engagement;
(g) one of said cam and cam followers being carried by said base and the other thereof carried by said means for permitting reciprocatory movements to said buffing wheel whereby movement of said second carriage in directions parallel to the axis of said first rotary shaft translates to movement of said buffing wheel in directions normal to the axis of said first rotary shaft responsive to engagement of said cam and cam follower;
(h) and a shroud partially enclosing said buffing wheel and mounted on said second carriage for rotation about an axis coaxial with respect to said buffing wheel, said shroud defining a laterally opening mouth and an outlet adapted to be connected to a source of suction, said mouth having longitudinally extending lip elements extending generally parallel to the axis of rotation of said buffing wheel whereby engagement of said lips with a tire mounted on the rotary shaft of said first carriage imparts rotary movements to said shroud;
(i) and means carried by said second carriage engageable with said shroud to retard rotary movements of said shroud.

11. The structure of claim 10 in which the means retarding rotary movements of said shroud include an arm, one end of which is pivotally mounted on said second carriage for movements of the other end toward and away from said shroud, a roller element rotatably mounted on said other end and engageable with said shroud and means biasing said arm to cause such engagement of said roller element with said shroud.

References Cited

UNITED STATES PATENTS

| | | | |
|---|---|---|---|
| 2,893,479 | 7/1959 | Sheridan et al. | 157—13 |
| 2,925,125 | 2/1960 | Curry | 157—13 |
| 3,162,233 | 12/1964 | Stull | 157—13 |
| 3,331,412 | 7/1967 | Sornsen | 144—288 |

GRANVILLE Y. CUSTER, Jr., Primary Examiner